(12) United States Patent
Zou et al.

(10) Patent No.: US 9,117,472 B1
(45) Date of Patent: Aug. 25, 2015

(54) PROCESSING A DATA SIGNAL WITH AN EMBEDDED POSITION SIGNAL

(71) Applicant: MARVELL INTERNATIONAL LTD., Hamilton (BM)

(72) Inventors: Qiyue Zou, San Jose, CA (US); Michael Madden, Mountain View, CA (US); Gregory Burd, San Jose, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/191,518

(22) Filed: Feb. 27, 2014

Related U.S. Application Data

(60) Provisional application No. 61/770,649, filed on Feb. 28, 2013.

(51) Int. Cl.
| | |
|---|---|
| G11B 5/09 | (2006.01) |
| G11B 20/10 | (2006.01) |
| G11B 21/02 | (2006.01) |
| G11B 5/596 | (2006.01) |

(52) U.S. Cl.
CPC .................................. *G11B 5/59627* (2013.01)

(58) Field of Classification Search
None
See application file for complete search history.

(56) References Cited

U.S. PATENT DOCUMENTS

| | | | |
|---|---|---|---|
| 4,286,296 A | 8/1981 | Cunningham | |
| 6,873,482 B1 | 3/2005 | Hsieh et al. | |
| 2013/0128386 A1* | 5/2013 | Zhang et al. | 360/135 |

* cited by examiner

*Primary Examiner* — Regina N Holder

(57) ABSTRACT

Systems, methods, and other embodiments associated with processing a read signal from a storage medium that includes continuous embedded position information are described. According to one embodiment, an apparatus includes read logic configured to control a storage device to generate the read signal by reading a first layer and a second layer of the storage medium. The first layer defines data and the second layer defines embedded position information. The apparatus includes data detection logic configured to process the read signal to recover the embedded position information. The read logic is configured to control the storage device based, at least in part, on the embedded position information.

20 Claims, 6 Drawing Sheets

PROCESSING A DATA SIGNAL WITH AN EMBEDDED POSITION SIGNAL

CROSS REFERENCE TO RELATED APPLICATIONS

This patent disclosure claims the benefit of U.S. Provisional Application Ser. No. 61/770,649 filed on Feb. 28, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Magnetic disks are one example of a storage medium that is used in computer systems to store data. In general, magnetic disks are part of disk drives (i.e., hard disk drive (HDD)), which are often used as primary storage devices in computer systems. Typically, a disk drive includes one or more magnetic disks mounted on a spindle for rotation at high speeds by a servo motor. Additionally, a set of read-write heads are provided proximate to the magnetic disks to transfer data between the magnetic disks and the computer system. In general, the read-write heads are controllably positioned in relation to the magnetic disks in order to read and/or write data at different tracks of a magnetic disk. The tracks are, for example, concentric rings within the magnetic disk where data is stored.

Furthermore, each of the magnetic disks includes a single layer of information that includes the concentric rings. In general, the single layer comprises both stored data and position information that are interspersed with each other. The position information (e.g., position error signal (PES)) is information within the single layer that is used to position a read-write head over a desired track. The position information is provided in wedges (also referred to as Servo wedges) within the single layer that interrupt the tracks within which the data is stored. That is, the position information consumes space on the magnetic disks and is provided in a wedge shape that spans the magnetic disk. In general, each magnetic disk has a plurality of wedges spanning across and interrupting the tracks so that neither data nor the position information is continuously stored around the entire circumference of a track.

However, because the position information is not continuous throughout the single layer of the magnetic disk and occurs only at the wedges which are interspersed among the tracks, a location of a read-write head cannot be exactly known when the read-write head is not over a wedge. That is, the position of the read-write head can only be precisely known when the read-write head passes over a wedge that includes the position information. When the read-write head is over areas between wedges, the system cannot obtain position information for the head. Therefore, the head is subject to positioning error that results from external disturbances and random noise. The disturbances and random noise cause the head to move from a desired position. Thus, when the head moves into the next Servo wedge, the positioning error will be detected and corrected. Accordingly, spacing between tracks must account for inaccuracies because of the intermittent position information. Thus, not only do the wedges consume storage space within the single layer of the magnetic disk, but the wedges affect data density since inter-track spacing is generally increased to tolerate these errors.

SUMMARY

In general, in one aspect this specification discloses an apparatus associated with processing a read signal produced from reading a storage medium of a storage device. The apparatus includes read logic configured to control the storage device to generate the read signal by reading a first layer and a second layer of the storage medium. The first layer defines data and the second layer defines embedded position information. The apparatus includes data detection logic configured to process the read signal to recover the embedded position information. The read logic is configured to control the storage device based, at least in part, on the embedded position information.

In another embodiment, the embedded position information and the data are continuous within the read signal. The read logic is configured to generate the read signal by simultaneously reading the first layer and the second layer. The data detection logic is configured to recover the data by using a modified signal to generate the data without the embedded position information. The data detection logic is configured to generate the modified signal by processing the read signal to remove at least part of the embedded position information. The embedded position information is a position error signal (PES).

In another embodiment, the apparatus includes servo logic configured to generate an estimate of the embedded position information according to a maximum likelihood estimation and the read signal. The first layer of the storage medium is a surface layer and a second layer of the storage medium is an embedded layer of the storage medium that is beneath the first layer. The storage medium is a magnetic storage disk.

In another embodiment, the data detection logic is configured to process the read signal by removing an estimate of the embedded position information from the read signal to produce a modified signal. The embedded position information is continuous throughout the second layer of the storage medium. The read signal includes the embedded position information, the data and noise.

In another embodiment, a first layer of the storage medium includes a plurality of concentric rings that are tracks encoded with the data. The second layer includes a plurality of concentric rings encoded with the embedded position information that defines locations within the storage medium. The read logic is configured to control the storage device to read the storage medium by reading the first layer and the second layer together.

In general, in another aspect, this specification discloses a method for processing a read signal produced from reading a storage medium of a storage device. The method includes controlling the storage device to generate the read signal by reading a first layer and a second layer of the storage medium, wherein the first layer defines data and the second layer defines embedded position information. The method includes processing the read signal to recover the embedded position information. Controlling the storage device is based, at least in part, on the embedded position information.

In general, in another aspect, this specification discloses a storage device. The storage device includes a storage medium that includes at least two separate layers for storing information. A first layer of the at least two layers includes stored data. A second layer of the at least two layers includes embedded position information that maps addresses within the storage medium. The storage device includes a signal processor configured to control a read-write head to generate a read signal by reading the storage medium based, at least in part, on the embedded position information. The read signal includes a data signal generated from reading the first layer and an embedded position signal generated from reading the second layer. The first layer and second layer are read simultaneously.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods and other embodiments associated with using a continuous embedded position signal to control a storage device. In one embodiment, an embedded position signal that is continuous is used to control the storage device. For example, the storage device includes a storage medium with at least two separate layers. A first layer defines stored data while a second layer that is embedded beneath the first layer defines the embedded position signal (i.e., the position information). In this way, position information is continuously available everywhere throughout the storage medium and, thus, the read-write head may be controlled with improved precision.

Figure 1:
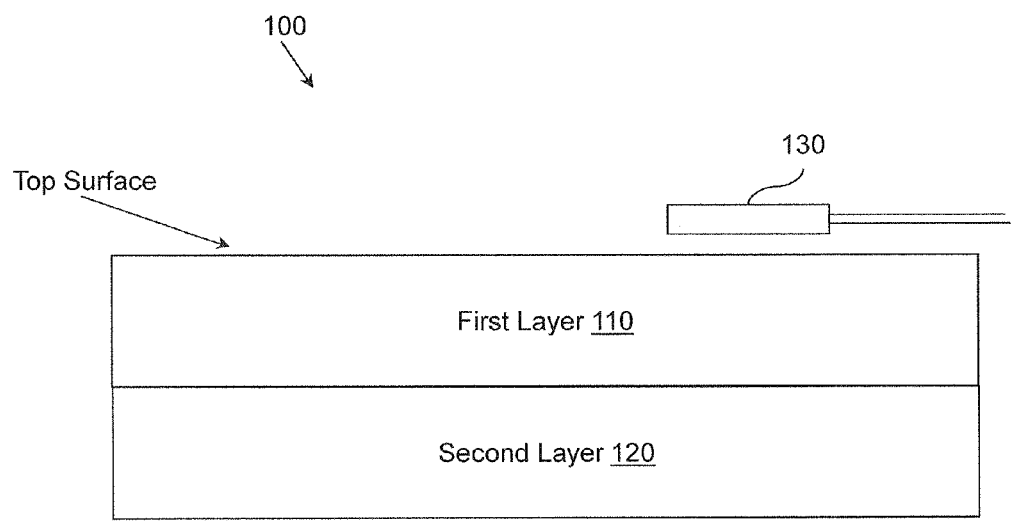
FIG. 1 illustrates one embodiment of a storage medium that includes a continuous embedded position signal.

With reference to FIG. 1, one embodiment of a storage medium 100 is illustrated in a cross-section view. The storage medium 100 is, for example, a magnetic disk/platter. The storage medium 100 includes a first layer 110 and a second layer 120. The first layer 110 includes a plurality of tracks that store data written to the storage medium 100 by a read-write head 130. The plurality of tracks will be discussed in greater detail subsequently with FIG. 2. The second layer 120 stores position information that is separate from the data in the first layer. Thus the position information is not interspersed between data. The position information defines locations/addresses for tracks within the plurality of tracks of the first layer 110. In one embodiment, the second layer 120 includes a plurality of concentric rings that store the position information continuously around the rings. As such, the position information is available at all locations around the storage medium. The position information maps the plurality of tracks to defined addresses/locations. In this way, the position information in the second layer 120 is used to guide the read-write head 130 to particular locations in the first layer 110 and, thus, to specific data stored in the first layer 110.

As used within this disclosure, position information, embedded information signal, continuous embedded information signal, embedded position signal, position error signal (PES) and embedded servo signal all generally refer to position information that is embedded within the second layer 120 of the storage medium 100 and that when read produces a signal that includes the position information. Additionally, in one embodiment, the position information is static. That is, the position information is not writable. Instead, the position information is, for example, permanent and is embedded as part of the second layer 120 of the storage medium 100. In another embodiment, the position information may be dynamically modified.

In one embodiment, the position information in the second layer 120 is, in general, a position error signal or location information that is used to locate data in the first layer 110. The position information within the second layer 120 acts as a mapping of the first layer 110. That is, the position information includes a mapping of locations within the first layer 110. Accordingly, the position information is used by, for example, a signal processor or controller to control a position of the read-write head 130 in relation to the storage medium 100. Thus, the signal processor controls the read-write head 130 to dynamically move to various positions over the storage medium 100 using the continuously available position information from the second layer 120.

In this way, an exact address/location or track beneath the read-write head 130 can continuously be determined so that a location of information being read/written is known. Accordingly, the position information (i.e., an embedded position signal) of the second layer 120 provides for precisely determining a location being read/written in the first layer 110 as the storage medium 100 rotates and as the read-write head 130 moves in relation to a surface of the storage medium 100.

Figure 2:
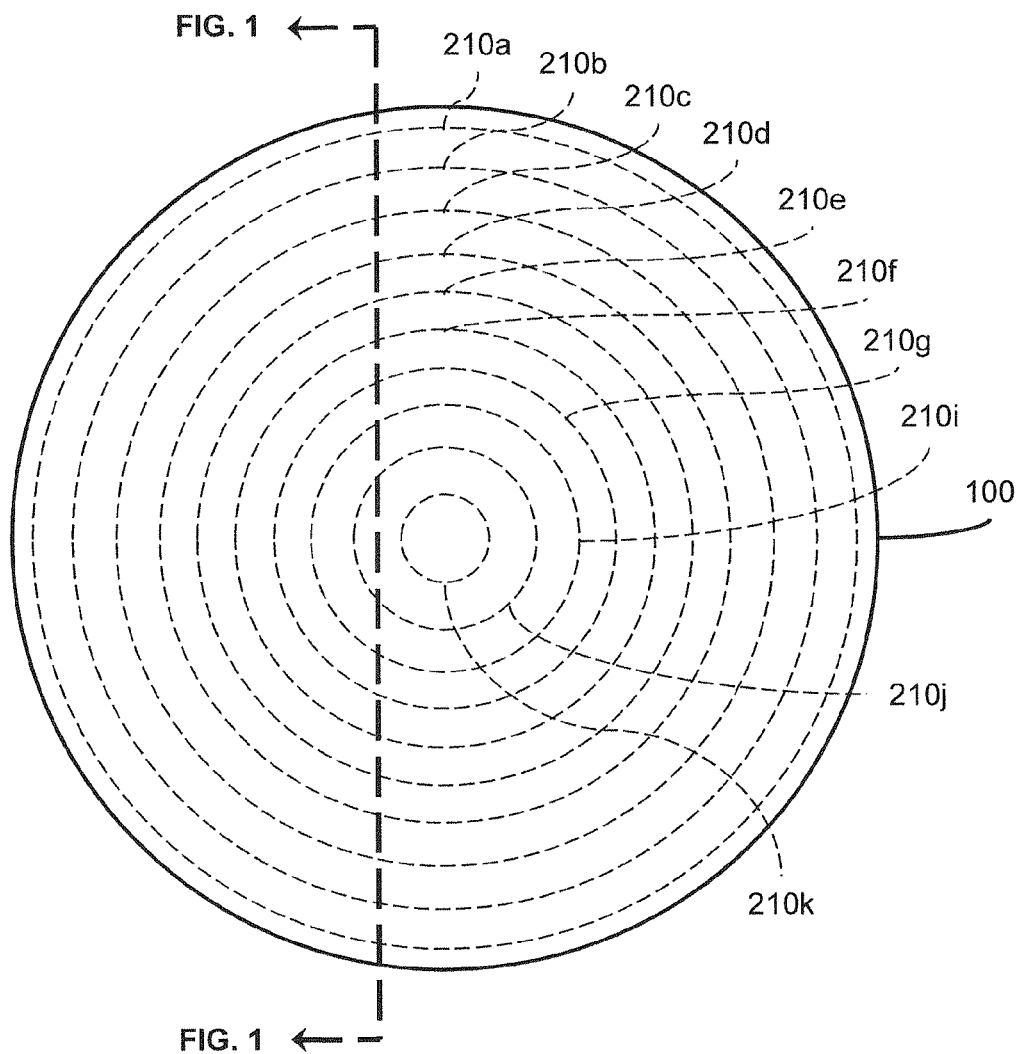
FIG. 2 illustrates a top-down view of the storage medium of FIG. 1.

With reference to FIG. 2, a top view of the storage medium 100 of FIG. 1 is shown. The storage medium 100 includes a plurality of tracks 210a, 210b, 210c, 210d, 210e, 210f, 210g, 210h, 210i, 210j and 210k (hereinafter referred to collectively as 210a-k) are shown as dashed rings to illustrate different locations in a surface layer of the storage medium 100 where data can be stored. The plurality of tracks 210a-k are concentric rings within the surface of the storage medium 100 that define regions for storing data.

The plurality of tracks 210a-k are illustrated for purposes of explanation only. That is, in various embodiments, the storage medium 100 may include a different number (e.g., thousands or more) of tracks or a different number of tracks per inch (tpi) than illustrated in FIG. 2 (e.g., 100 tpi or more). In general, the plurality of tracks 210a-k are defined by position information that is embedded within the second layer 120 of the storage medium 100 (not seen in FIG. 2). As previously discussed, the second layer 120 is beneath the first layer 110 and includes position information for mapping/addressing the plurality of tracks 210a-k. Locations of the plurality of tracks 210a-k and positions within each of the plurality of tracks 210a-k in the storage medium 100 are defined according to the position information in the second layer 120.

Thus, as a result of the storage medium 100 including two layers 110 and 120, a signal produced from the read-write head 130 when reading the storage medium 100 is a combination of information from both of the layers 110 and 120. That is, the read-write head 130 simultaneously reads the first layer 110 and the second layer 120 and does not read each layer separately. Consequently, a read signal provided by the read-write head 130 includes both data in the form of a data signal from the first layer 110 and position information in the form of an embedded position signal from the second layer 120.

This combined read signal with the embedded position signal (i.e., position information) and the data signal (i.e., data) is processed in order to isolate the position information and the data from the read signal. Additionally, the read signal may also include noise, which degrades the data signal and the embedded position signal and, thus, may be processed out of the read signal to isolate the embedded position signal and/or the data signal.

Figure 3:
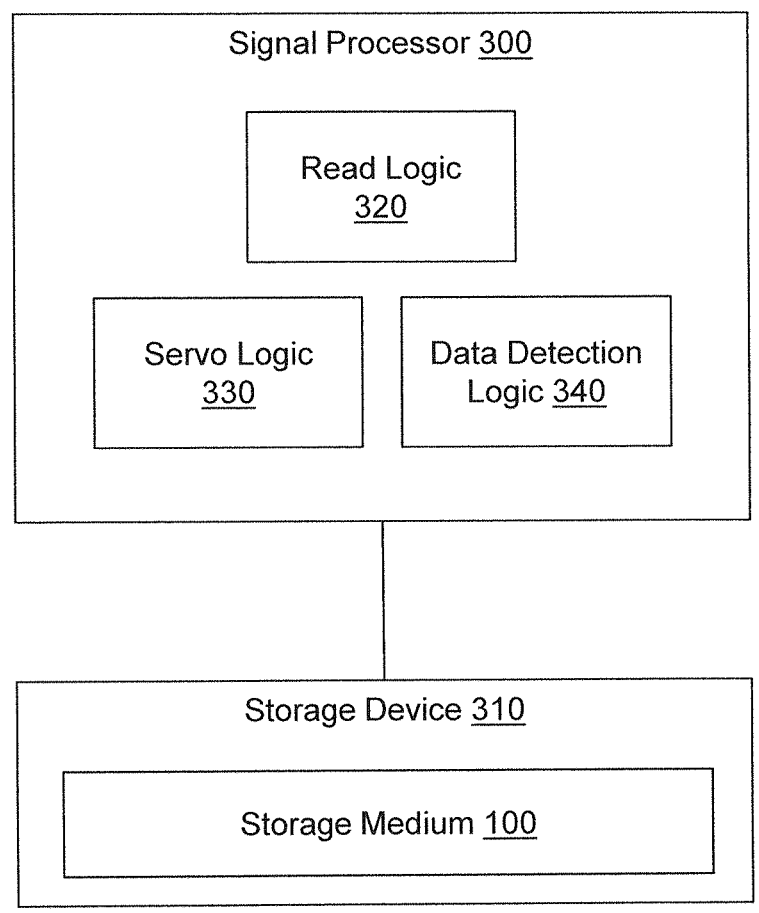
FIG. 3 illustrates one embodiment of a signal processor associated with processing a read signal that includes a continuous embedded position signal.

With reference to FIG. 3, one embodiment of a signal processor 300 associated with using an embedded position signal that is continuous to control a storage device 310 is illustrated. In one embodiment, the signal processor 300 includes read logic 320, servo logic 330 and data detection logic 340. In general, the signal processor 300 communicates with the storage device 310 to store and retrieve information. That is, the signal processor 300 controls the storage device 310 to store information and to read information from the storage medium 100.

The storage medium 100 is, for example, a magnetic disk, magnetic platter or other medium for storing data that uses a device (e.g., read-write head), which is controllably positioned proximate to the storage medium 100 to read and write data. Accordingly, the storage device 310 may be a hard disk drive (HDD) or other device that stores and provides information using a position-able read-write device.

For example, the read logic 320 is configured to control the storage device 310 to generate a read signal by simultaneously reading the first layer 110 and the second layer 120 together. The read logic 320 controls a read-write head (e.g., read-write head 130) in the storage device 310 as a function of the embedded position signal that is part of the read signal. That is, as the storage medium 100 is read, both data (i.e., data signal) and position information (i.e., embedded position signal) are generated at any given location to produce the read signal.

Accordingly, the read logic 320 uses the position information that is continuously read from the storage medium 100 and continuously determined from the read signal to control a position of the read-write head. Thus, the read-write head can be precisely controlled to read and/or write a precise location within the storage medium 100. In this way, an improved data density is achieved by precisely controlling the storage device 310 using the continuous embedded position signal.

Further consider that the read signal is processed in order to isolate the position information and the data from the read signal. In one embodiment, the servo logic 330 is configured to generate an estimate of the embedded position signal. The servo logic 330 generates the estimate of the embedded position signal according to, for example, a maximum likelihood estimation. In one embodiment, the servo logic 330 is configured to perform the maximum likelihood estimation based, at least in part, on the read signal. In general, the estimate is an approximation of the embedded position signal that is used to remove the embedded position signal from the read signal in order to obtain the data signal.

For example, the data detection logic 340 processes the read signal by subtracting the estimate of the embedded position signal from the read signal to produce a modified signal. Thereafter, the data detection logic 340 generates a reproduction of the data signal (i.e., stored data bits) from the modified signal. In one embodiment, the data detection logic 340 is configured to reproduce/recover the data signal (stored data bits) by demodulating and decoding the modified signal. Thus, the data detection logic 340 recovers the data bits without the embedded position signal.

Additionally, in one embodiment, the servo logic 330 is configured to use the reproduced data signal (i.e., recovered data bits) to reproduce the embedded position signal. The servo logic 330 reproduces the embedded position signal by, for example, subtracting the reproduction of the data signal from the original read signal. In this way, the embedded position signal can be continuously reproduced from the read signal and used to control a location of the read-write head 130 of FIG. 1 in relation to the storage medium 100.

Figure 4:
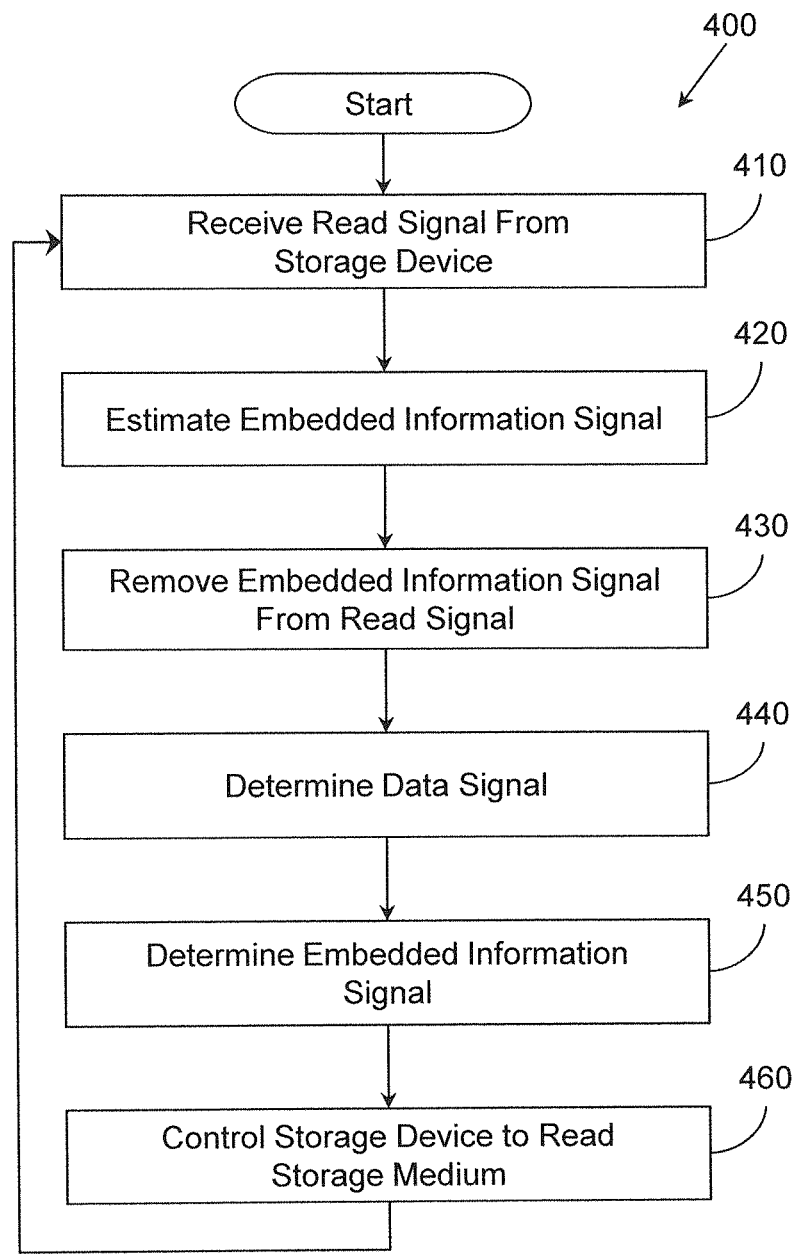
FIG. 4 illustrates one embodiment of a method associated with processing a combined continuous embedded position signal and a data signal.
Figure 5:
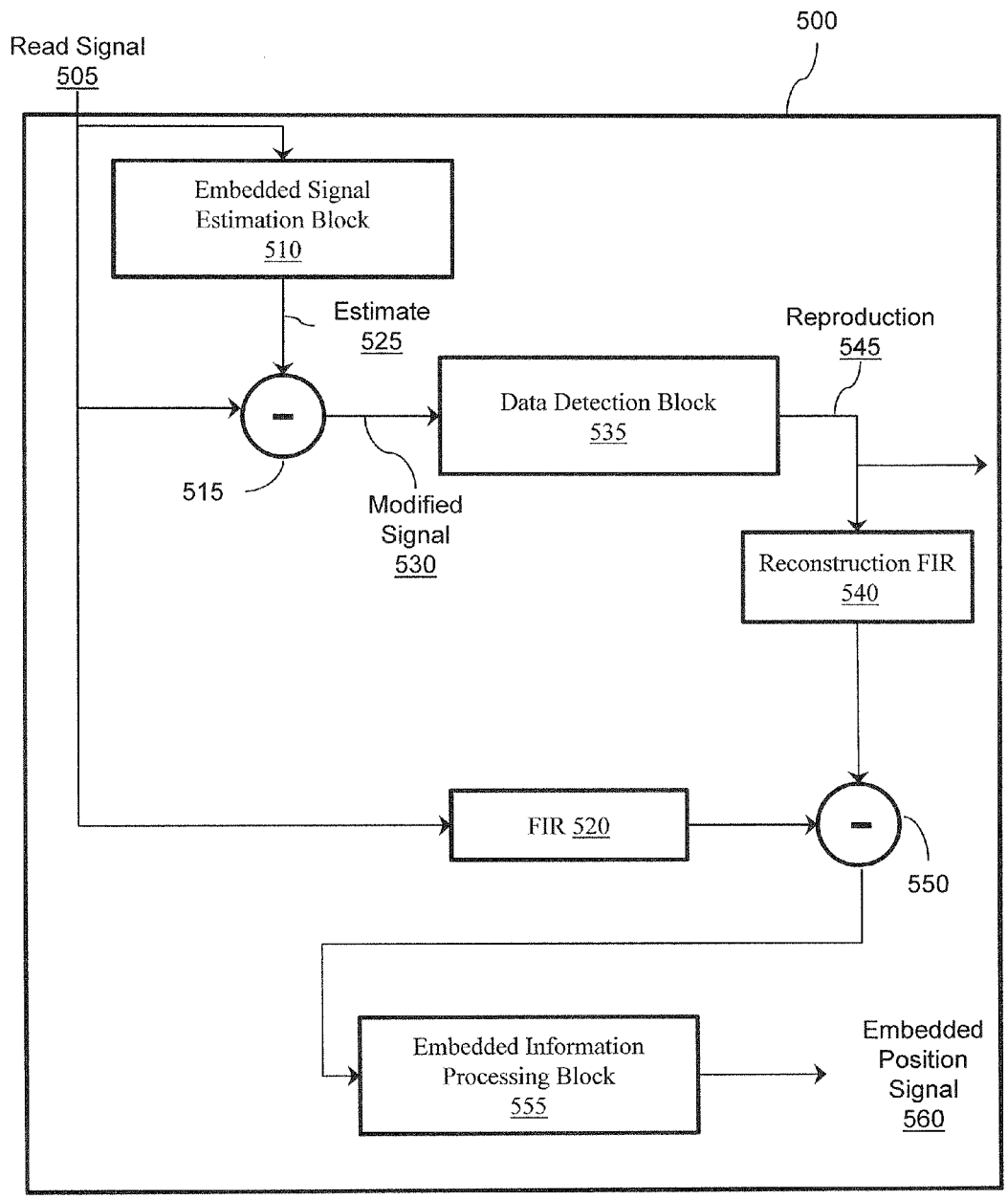
FIG. 5 illustrates one embodiment of an apparatus associated with processing a read signal that includes a continuous embedded position signal.

Further details of processing the read signal will be discussed in relation to FIGS. 4 and 5. FIG. 4 illustrates one embodiment of a method 400 associated with using a continuous embedded position signal to control a storage device. For purposes of illustration, the method 400 will be discussed along with the integrated circuit 500 of FIG. 5. However, in general, the method 400 is not limited to structures shown in the integrated circuit 500 but is discussed along with FIG. 5 as one example of how the method 400 may operate.

At 410 of method 400, a read signal 505 is received from a storage device such as the storage device 110 of FIG. 1. The read signal 505 includes at least an embedded position signal and a data signal that are produced when the storage device reads two separate layers of a storage medium coincidentally. In general, the data signal and the embedded position signal are parallel continuous signals that combine to form the read signal 505. The read signal 505 may also include noise (e.g., an interference signal) from, for example, various interfering sources (e.g., electronic noise and so on).

Equation 1 illustrates a representation of the read signal 505 and components of the read signal 505.

$$y(n)=x(n)+s(n)+w(n) \qquad \text{Equation 1:}$$

Where y(n) represents the read signal 505
x(n) represents the data signal
s(n) represents the embedded position signal
w(n) represents noise that is present in the read signal 505

The read signal 505 is provided to an embedded signal estimation block 510, a signal combiner 515 and a finite impulse response filter (FIR) 520 in the integrated circuit 500.

At 420, the embedded signal estimation block 510 generates an estimate 525 of the embedded position signal in the read signal 505. In one embodiment, the embedded signal estimation block 510 is configured to use a maximum likelihood estimation (MLE) or another estimation technique to generate the estimate 525. In either case, the embedded position signal may be represented by Equation 2 when sinusoidal and the estimate 525 is represented by equation 3.

$$s(n)=A\sin(\omega n)+B\cos(\omega n) \qquad \text{Equation 2:}$$

$$\hat{s}(n)=\hat{A}\sin(\omega n)+\hat{B}\cos(\omega n) \qquad \text{Equation 3:}$$

As illustrated by Equation 2 and Equation 3, the embedded position signal can be represented as a sinusoidal waveform according to a sinusoidal waveform model. Accordingly, the embedded signal estimation block 510 estimates A and B of Equation 3, at 420, to construct the estimate 525 using, for example, maximum likelihood estimation (MLE). Thus, the estimate 525 approximates the actual embedded position signal.

At 430, the signal combiner 515 removes the estimate 525 from the read signal 505, as represented by Equation 4.

$$x(n)+[s(n)-\hat{s}(n)]+w(n) \qquad \text{Equation 4:}$$

Accordingly, the signal combiner 515 produces a modified signal 530, which is provided to a data detection block 535. The modified signal 530 includes the data signal (x(n)), noise (w(n)) and any remaining portions of the embedded position signal ([s(n)−ŝ(n)]) that were not removed by subtracting the estimate 525.

Thus, at 440, the data detection block 535 demodulates the modified signal 530 and performs detection to produce a reproduction 545 (e.g., recovered data bits). of the data signal from the modified signal 530. The reproduction 545 is a processed form of the read signal 505 without the embedded position signal. In general, the data detection block 535 demodulates and decodes the modified signal 530 to produce the reproduction 545 of the data signal. The reproduction 545 of the data signal may be provided to a computing system as data bits recovered from the read signal 505.

At 450, the reproduction 545 of the data signal is removed (i.e., subtracted) from the read signal 505 by a signal combiner 550 and passed to an embedded information processing block 555. The embedded information processing block 555 generates the embedded position signal 560. Equation 5 illustrates removal of the reproduction (x̂(n)) 545 of the data signal from the read signal 505 to retrieve the embedded position signal 560 (s(n)).

$$[x(n)-\hat{x}(n)]+s(n)+w(n) \quad \text{Equation 5:}$$

The embedded information processing block 555 recovers the embedded position signal 560. As discussed previously, the embedded position signal 560 is a position error signal (PES) or other embedded location/address information that may be used to control a location of a read-write head in relation to a storage medium.

At 460, the embedded position signal 560 determined by the integrated circuit 500 is used to control (e.g., dynamically adapt) a location of a read-write head in a storage device. That is, the embedded position signal 560 is continuously provided since it is present throughout the storage medium without gaps in the embedded position signal 560. Thus, the embedded position signal 560 can be used continuously to track and modify where the read-write head is located in relation the surface of the storage medium. In this way, the embedded position signal 560 is used to precisely control the storage device.

As a result, in one embodiment, space between tracks on the storage medium can be reduced and a width of the tracks can also be reduced. Accordingly, additional tracks can be fit onto a storage medium thereby increasing a tpi (tracks per inch) of the storage medium and, thus, a data density of the storage medium.

Figure 6:
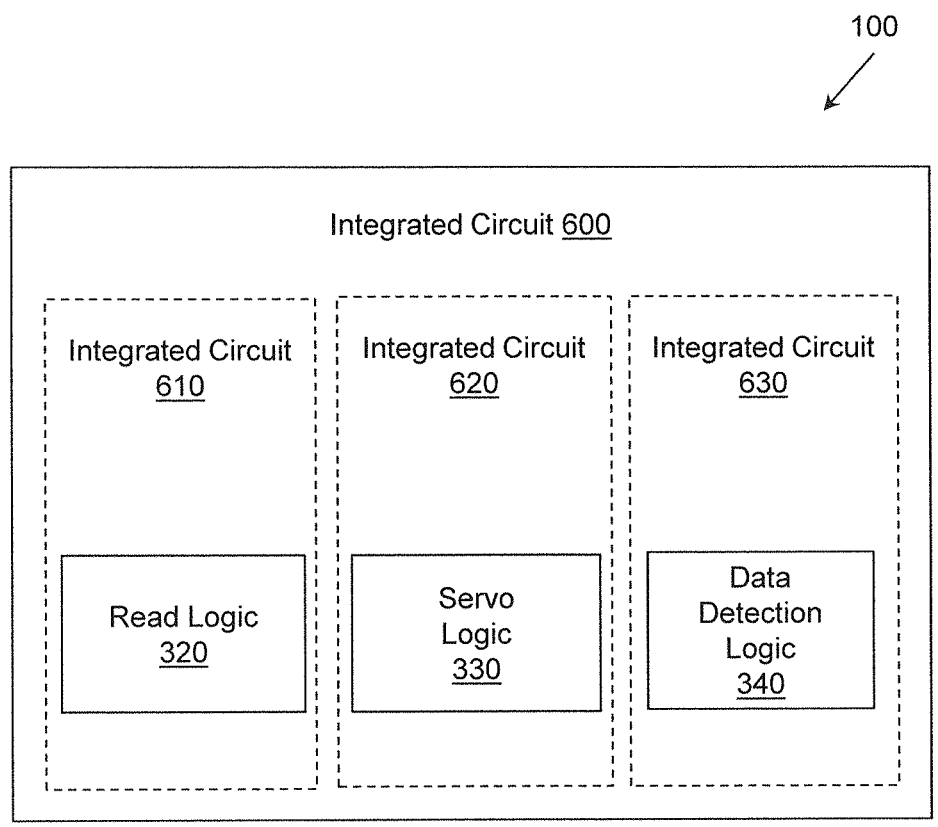
FIG. 6 illustrates one embodiment of an integrated circuit associated with processing a read signal that includes a continuous embedded position signal.

FIG. 6 illustrates an additional embodiment of the signal processor 300 from FIG. 3 that is configured with separate integrated circuits and/or chips. In this embodiment, the read logic 320 from FIG. 3 is embodied as a separate integrated circuit 610. Additionally, the servo logic 330 is embodied on an individual integrated circuit 620. The data detection logic 330 is also embodied on an individual integrated circuit 630. The circuits are connected via connection paths to communicate signals. While integrated circuits 610, 620, and 630 are illustrated as separate integrated circuits, they may be integrated into a common integrated circuit board 600. Additionally, integrated circuits 610, 620, and 630 may be combined into fewer integrated circuits or divided into more integrated circuits than illustrated. In another embodiment, the read logic 320, the servo logic 330, and the data detection logic 340 (which are illustrated in integrated circuits 610, 620, and 630, respectively) may be combined into a separate application-specific integrated circuit. In other embodiments, portions of the functionality associated with the read logic 320, the servo logic 330, and the data detection logic 340 may be embodied as firmware executable by a processor and stored in a non-transitory memory (e.g., a non-transitory computer-storage medium).

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C. §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein are limited to statutory subject matter under 35 U.S.C. §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus associated with processing a read signal produced from reading a storage medium of a storage device, the apparatus comprising:
   read logic configured to control the storage device to generate the read signal by reading a first layer and a second layer of the storage medium, wherein the first layer defines data and the second layer defines embedded position information,
   wherein the read signal is comprised of two separate signals that include a first signal that is the data and a second signal that is the embedded position information;
   data detection logic configured to process the read signal to recover the data by removing an estimate of the second signal from the read signal to produce a reproduction of the first signal; and
   servo logic configured to reproduce the embedded position information by subtracting the reproduction of the first signal that includes the data from the read signal, wherein the read logic is configured to control the storage device based, at least in part, on the embedded position information.

2. The apparatus of claim 1, wherein the embedded position information and the data are continuous within the read signal, wherein the read logic is configured to generate the read signal by simultaneously reading the first layer and the second layer,
   wherein the data detection logic is configured to recover the data by using a modified signal to generate the reproduction of the first signal from the read signal without the embedded position information, wherein the data detection logic is configured to generate the modified signal by processing the read signal to remove at least part of the embedded position information using the estimate of the second signal, wherein the estimate of the second signal is based, at least in part, on a sinusoidal waveform model and wherein the embedded position information is a position error signal (PES).

3. The apparatus of claim 1,
   wherein the servo logic is configured to generate the estimate of the second signal according to a maximum likelihood estimation and the read signal, wherein the first layer of the storage medium is a surface layer and a second layer of the storage medium is an embedded layer of the storage medium that is beneath the first layer, and wherein the storage medium is a magnetic storage disk.

4. The apparatus of claim 1, wherein the embedded position information includes position information about a location of a disk read-write head in relation to tracks of the storage medium.

5. The apparatus of claim 1, wherein the data detection logic is configured to process the read signal by removing the estimate of the second signal that includes the embedded position information from the read signal to produce a modified signal, wherein the embedded position information is continuous throughout the second layer of the storage medium, and wherein the read signal includes the embedded position information, the data and noise.

6. The apparatus of claim 5, wherein the data detection logic is configured to recover the first signal that includes the data using the modified signal by demodulating and decoding the modified signal to produce the reproduction of the first signal that includes the data, and wherein the read logic is configured to control the storage device to read the storage medium by controlling the storage device to read both of the first layer and the second layer simultaneously to produce the read signal.

7. The apparatus of claim 1, wherein the first layer of the storage medium includes a plurality of concentric rings that are tracks encoded with the data, wherein the second layer includes a plurality of concentric rings encoded with the embedded position information that defines locations within the storage medium, and wherein the read logic is configured to control the storage device to read the storage medium by reading the first layer and the second layer together.

8. A method for processing a read signal produced from reading a storage medium of a storage device, the method comprising:
   controlling the storage device to generate the read signal by reading a first layer and a second layer of the storage medium, wherein the first layer defines data and the second layer defines embedded position information
   recovering the data from the read signal by subtracting an estimate of the embedded position information to generate a reproduction of the data without the embedded position information; and
   processing the read signal to recover the embedded position information by subtracting the reproduction of the data from the read signal,
   wherein controlling the storage device is based, at least in part, on the embedded position information.

9. The method of claim 8,
   wherein recovering the data includes generating a modified signal by removing at least part of the embedded position information from the read signal and using the modified signal to recover the data, and wherein the storage medium is a magnetic storage disk.

10. The method of claim 8, wherein processing the read signal includes:
    generating the estimate of the embedded position information according to a maximum likelihood estimation and the read signal, wherein the estimate is an approximation of the embedded position information.

11. The method of claim 8,
    wherein the embedded position information includes position information about a location of a disk read-write head in relation to tracks of the storage medium, and wherein the estimate of the embedded position information is based, at least in part, on a sinusoidal waveform model.

12. The method of claim 8, wherein recovering the data from the read signal includes removing the estimate of the embedded position information from the read signal to produce a modified signal, wherein the embedded position information is continuous throughout the second layer of the at least two layers that is separate from the first layer, and wherein the read signal includes the embedded information signal, the data signal and noise.

13. The method of claim 12, wherein recovering the data from the read signal includes reproducing the data signal that includes the data by demodulating and decoding the modified signal to reproduce the data signal.

14. The method of claim 8, wherein controlling the storage device to read the storage medium includes controlling the storage device to read both the first layer and the second layer simultaneously to produce the read signal that includes the embedded position information and the data.

15. The method of claim 8, further comprising:
    encoding a first layer of the storage medium with data that when read produces the data signal; and encoding the second layer with position information about a location within the storage medium, wherein reading the second layer produces a servo signal with the embedded position information.

16. A storage device, comprising:

a storage medium that includes at least two separate layers for storing information, wherein a first layer of the at least two layers includes stored data, and wherein a second layer of the at least two layers includes embedded position information that maps addresses within the storage medium; and a signal processor configured to control a read-write head to generate a read signal by reading the storage medium based, at least in part, on the embedded position information, wherein the read signal includes a data signal generated from reading the first layer and an embedded position signal generated from reading the second layer, wherein the first layer and second layer are read simultaneously, wherein the signal processor is configured to remove an estimate of the embedded position signal from the read signal to reproduce the data signal, and wherein the signal processor is configured to remove the reproduced data signal from the read signal to generate the embedded position signal without the data signal.

17. The storage device of claim 16, wherein the signal processor is configured to control the read-write head by controlling a position of the read-write head in relation to a surface of the storage medium as a function of the embedded position information from the embedded position signal, and wherein the first layer is a surface layer of the storage medium and the second layer is an embedded layer of the storage medium that includes the embedded position information continuously throughout the second layer.

18. The storage device of claim 16, wherein the signal processor is configured to estimate the embedded position signal based, at least in part, on a sinusoidal waveform model.

19. The storage device of claim 18, wherein the embedded position signal is continuous throughout the storage medium.

20. The storage device of claim 16, wherein the embedded position signal is a position error signal (PES) that is used to guide reading of the storage medium.

* * * * *